United States Patent

[11] 3,561,509

| | | |
|---|---|---|
| [72] | Inventor | Roy E. Hayden<br>Grants Pass, Oreg. |
| [21] | Appl. No. | 778,407 |
| [22] | Filed | Nov. 25, 1968 |
| [45] | Patented | Feb. 9, 1971 |
| [73] | Assignee | Vanply, Inc.<br>Albany, Oreg.<br>a corporation of Washington |

[54] SURFACE TEXTURIZING APPARATUS
7 Claims, 3 Drawing Figs.

[52] U.S. Cl. .................................................. 144/123,
144/249, 144/309
[51] Int. Cl. ...................................................... B27c 1/00
[50] Field of Search........................................... 144/123,
121, 309-1, 115, 208—9, 135, 326, 13, 249, 114

[56] References Cited
UNITED STATES PATENTS
2,642,904  6/1953  Pearce........................... 144/208—9

3,299,922  1/1967  Vonhof........................ 144/115-X

*Primary Examiner*—Gil Weidenfeld
*Attorney*—Kolisch & Hartwell

ABSTRACT: Apparatus for producing a textured surface on a workpiece conveyed along a path, the apparatus including a continuous chain body with cutter teeth secured to and projecting outwardly from the chain body, with the cutter teeth being adapted to be drawn across the surface of the workpiece. The chain body comprises multiple side-by-side strands of endless roller chain connected to each other, and the cutter teeth are secured between adjacent strands of roller chain. Elongated opposed guides support opposite sides of each of said strands of chain in that reach of the chain body which produces cutting during operation of the apparatus. The guides may be adjusted to vary the working clearance between the guides and the chain body. Disassembly of a cutter tooth may be done without breaking the continuity of the chain body.

Roy E. Hayden
INVENTOR
BY Kolisch + Hartwell
Attys.

Roy E. Hayden
INVENTOR
BY
Kolisch + Hartwell
Attys.

SURFACE TEXTURIZING APPARATUS

This invention relates to apparatus for producing a textured surface on a workpiece, and more particularly to such apparatus employing cutters mounted on an endless chain.

Recently, demand has grown for finished plywood and other wood products having a roughened surface texture, often referred to as a "resawn" texture. The term "resawn" is used because of its resemblance to resawn lumber. The texture is produced by cutting away portions of the surface of a face veneer in plywood.

A general object of the invention is to provide novel apparatus for producing a textured surface on a workpiece, such as plywood, which apparatus is simple and economically constructed.

Another object is to provide apparatus for roughening and thus texturizing the face of a panel, including a chain body supporting teeth that perform the roughening, in a novel organization whereby twisting and other deflections of the chain body are inhibited whereby more uniform results are obtainable, with smoother running of the machine.

Another object is to provide such apparatus having a construction which facilitates the removal of a cutter tooth by enabling such to be done without breaking the continuity of the endless chain body mounting the tooth.

More specifically, the invention contemplates a roller chain body and cutter teeth assembly wherein the cutter teeth are mounted between adjacent strands of roller chain in the chain body, and a tooth may be removed by removing links from a strand on one side of the tooth only, leaving the strand of roller chain on the other side intact. In this way the chain is not severed and may remain in place when repair of a tooth is needed.

Further contemplated is novel support means or structure for the chain body which makes use of the multiple strand construction of the chain body in the stabilizing of the chain body.

A further object is to provide a novel adjustable frame on which the support means for the chain body is mounted, with the frame being positionable to vary the working clearance between the support means and the chain body.

These and other objects and advantages will become more fully apparent as the following description is read in conjunction with the drawings, wherein.

Figure 1:
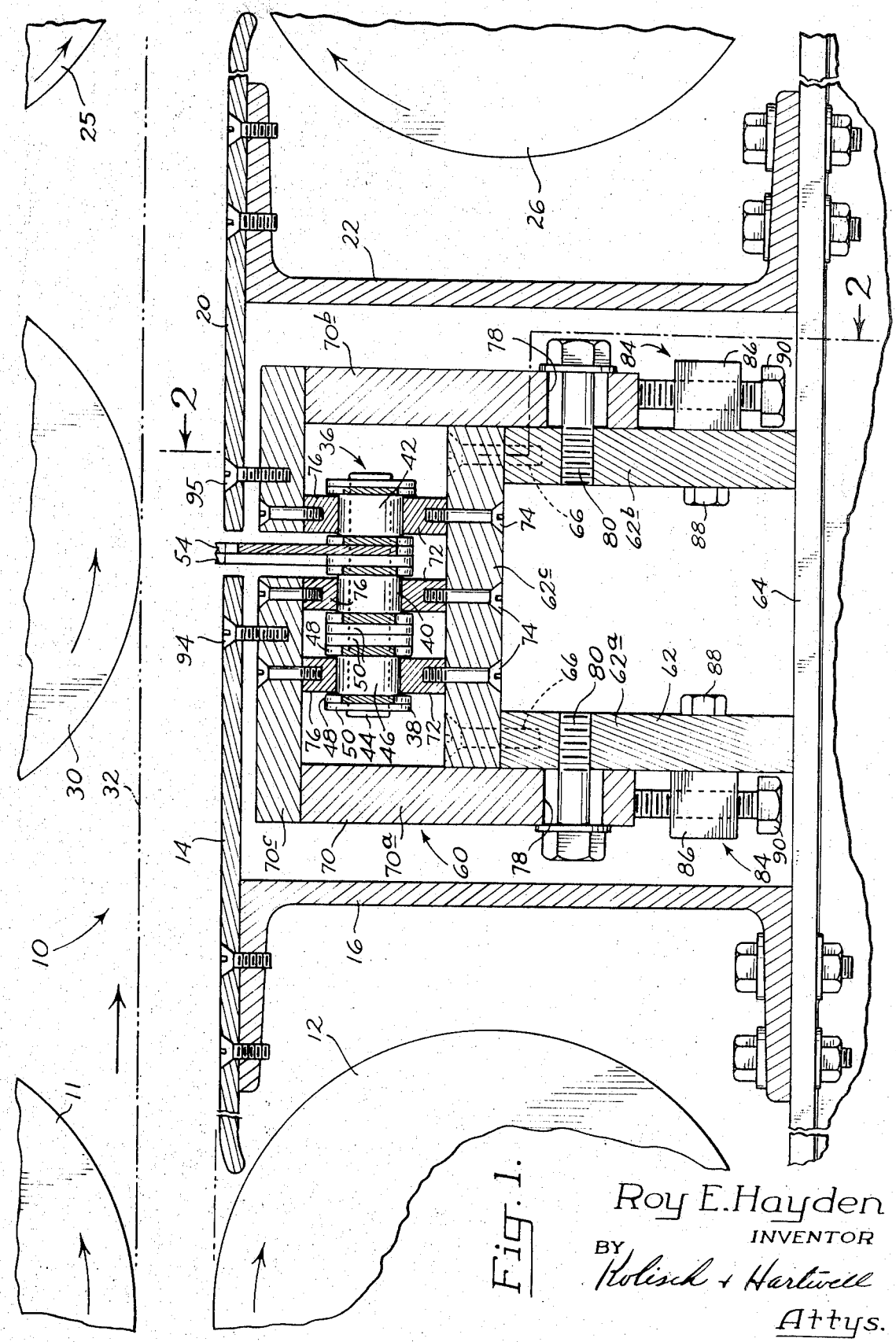
FIG. 1 is a cross-sectional side elevation of apparatus for producing a textured surface on a workpiece which is constructed in accordance with an embodiment of the invention.

Referring now to the drawings, and first more particularly to FIG. 1, at 10 is indicated generally the apparatus contemplated for producing a textured surface on a workpiece. The apparatus includes a pair of opposed, vertically spaced-apart feed rollers 11, 12, and a substantially horizontal bed plate 14 on the off-bearing side of the rollers. The bed plate is secured to the upper flange of a channel 16, with its upstream end at the left of FIG. 1 adjacent roller 12 and with its upper surface at substantially the same elevation as the top of roller 12. The bed plate guides the lower surface of a panel as it is advanced from left to right in FIG. 1 through the apparatus.

The apparatus further includes a substantially horizontal bed plate 20 downstream from bed plate 14. The upstream edge of bed plate 20 is spaced slightly from the downstream edge of bed plate 14. Bed plate 20 is secured to the top flange of a channel 22. The bed plate guides the lower surface of a panel after it has been cut to texturize it.

A pair of opposed, vertically spaced-apart outfeed rollers 25, 26 are positioned downstream from bed plate 20. The top of the lower roller is disposed at substantially the same elevation as the top surface of bed plate 20.

Rollers 12 and 26 are connected to appropriate drive means for rotating them in such a direction that a workpiece, such as a plywood panel, is moved from left to right in FIG. 1 through the apparatus. The outline of such a panel is shown in FIG. 1 by the dotted and dashed line 32.

A roller 30 is supported above the bed plates directly over the space between the bed plates. This roller is spring-biased downwardly so that it will press downwardly against the top surface of a panel being processed to hold it against the bed plates. In doing such, it constitutes a biasing means in the organization.

Figure 3:
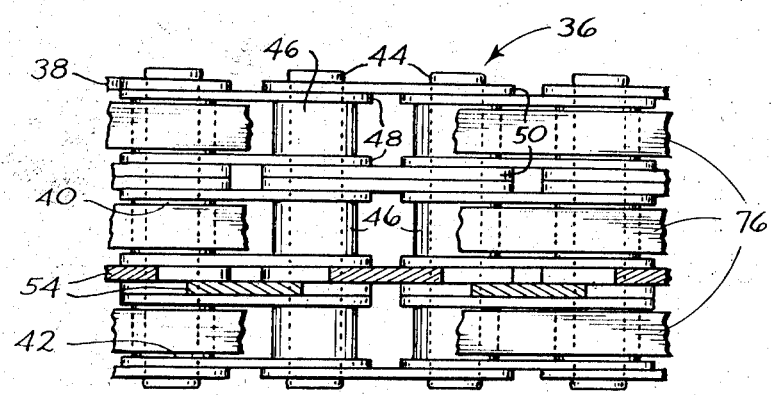
FIG. 3 is a view taken generally along the line 3–3 in FIG. 2.
Figure 2:
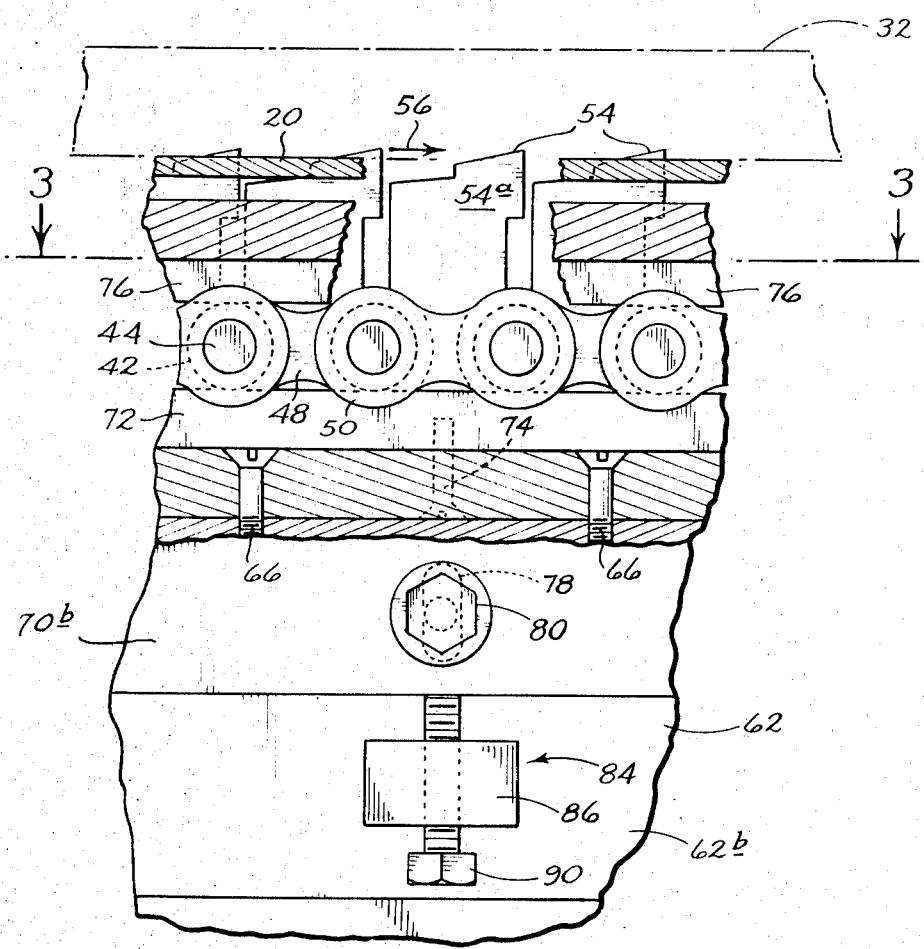
FIG. 2 is a view taken generally along the line 2–2 in FIG. 1, illustrating a section of a roller chain body in the apparatus, such having cutter teeth secured thereto, and portions of a support frame for the chain body.

Referring now to FIGS. 1, 2 and 3, at 36 is indicated generally a portion of a reach of a chain body, which extends substantially horizontally and transversely of the path of a workpiece conveyed through the apparatus. The chain body comprises three endless elongated strands of roller chain 38, 40, 42, respectively, which are connected to each other in side-by-side relationship.

Since the strands of roller chain are all substantially the same, only that indicated at 38 will be described in detail. Referring to FIGS. 1 and 3, it will be seen that the roller chain comprises a number of interconnected links which include pins 44 extending transversely of the length of the chain, with rollers 46 journaled for rotation on the pins. Opposed pairs of elongated roller link plates 48 are journaled adjacent their opposite sets of ends on adjacent pins 44 in successive pairs of pins, and elongated pin link plates 50 are journaled adjacent their opposite sets of ends on adjacent pins which are not interconnected by roller link plates 48. In the chain body illustrated pins 44 extend completely through the combined widths of the three strands of roller chain 38, 40, 42 to interconnect them.

A series of cutter teeth 54, having upper portions 54a of the configuration illustrated in FIG. 2 and lower portions (hidden in FIG. 2) which are shaped similar to pin link plates 50, are mounted on pins 44 between adjacent strands of roller chains 40, 42, and take the place of the pin link plates in these two strands. As is best seen in FIGS. 1 and 2, the cutter teeth project outwardly from the chain body, through the space between bed plates 14, 20, and project somewhat beyond the upper surfaces of the bed plates.

The chain body is supported with its upper reach extending transversely of the path for the panels through the apparatus, and suitable sprockets (not shown), at least one of which is power driven, train the extremities of the chain body.

The chain body is supported under the bed plates in a frame structure indicated generally at 60 in FIG. 1. This frame structure includes an elongated subframe 62, which has an inverted U-shaped cross section, and extends transversely of the path of the workpiece beneath bed plates 14, 20. The subframe 62 comprises a pair of opposed, upright, spaced-apart, side plates 62a, 62b which are interconnected by a top plate 62c spanning the distance between the two side plates and secured to their tops by screws 66. The lower edges of side plates 62a, 62b are secured in a suitable manner to a base frame 64 which also provides support for other components in the apparatus.

Also part of the frame structure is a second elongated subframe 70, also having an inverted U-shaped cross section. Subframe 70 overlies and is slidably mounted on subframe 62 for movement vertically relative to subframe 62. Subframe 70 comprises a pair of opposed, upright side plates 70a, 70b, and a top plate 70c which spans the distance between the side plates and is suitably secured to their upper edges.

A series of laterally spaced-apart, elongated guide bars 72 are secured to the upper surface of top plate 62c of subframe 62, by screws 74. These guide bars parallel the strands of roller chain within the chain body. Another series of laterally spaced-apart, elongated guide bars 76 are secured to the under surface of top plate 70c of subframe 70, and these guide bars likewise parallel the strands of roller chain within the chain body. Each of the guide bars 76 is positioned directly above and is spaced from an associated one of the guide bars 72. The rollers in the strands of chain rest on guide bars 72 with opposed link plates on the chains projecting downwardly from the lower surfaces of the rollers to present shoulders on either side of the guide bars inhibiting lateral movement of the chains on the guide bars. Guide bars 76 similarly fit between opposed link plates on the roller chain, and subframe 70 is so positioned on subframe 62 that the lower surfaces of guide bars 76 are disposed closely adjacent the tops of rollers 46. Thus, guide bars 72 and 76 act to confine opposite sides of the strands of roller chain within the chain body to inhibit lateral movement, as well as twisting, of the chain body.

As is best seen in FIGS. 1 and 2, each of side plates 70a, 70b has an oblong bore 78 extending horizontally therethrough, such bore having its major axis positioned vertically. A bolt 80 extends through each of the bores 78 and is received in a threaded bore provided in a side plate of subframe 62. With bolts 80 loosened, subframe 70 may be adjusted vertically relative to subframe 62, and with bolts 80 tightened, the side plates of subframe 70 are brought into tight frictional contact with the side plates of subframe 62 to lock subframe 70 against movement.

Facilitating adjustment of subframe 70 relative to subframe 62 are screw-type adjusters 84, secured to subframe 62. Each adjuster includes a block 86 secured to a side plate of subframe 62, as by bolts 88. A bolt 90 extends upwardly through an accommodating threaded bore in block 86, to contact the underside of a side plate of subframe 70. With lock bolts 80 loosened, adjustment of bolt 90 either urges subframe 70 to move up or permits it to slide down by virtue of its weight, dependent on the direction of adjustment of bolt 90. This adjustability of subframe 70 permits varying the distance between guide bars 72, 76 to provide the desired working clearance between the guide bars and the roller chains.

Screws 94 extend through bed plate 14 adjacent the right edge thereof in FIG. 1, and into threaded bores in top plate 70c of the frame structure. These screws provide a means for adjusting the distance by which cutter teeth 54 project above the bed plate 14 and into the path of the workpiece. This adjusting, therefore, affords a means for altering the depth of cut produced by the cutter. Screws 95 anchor the left margin of bed plate 20 to subframe 70. With bed plate 20 guiding the panel after the cutting by teeth 54, normally the margin of the bed plate is at a slightly higher elevation than the right margin of plate 14.

The operation of the apparatus described should be obvious. On feeding a panel, such as a plywood panel between the feed rollers 11, 12, such is advanced under the biasing roller 30, with portions of the lower face of the panel then being cut away by the action of the cutters moving across the panel as carried by the chain body described.

A particular feature of the instant invention is the ability of the apparatus to produce a rough texturing of the faces of panels which texturing is consistent throughout a given panel and maintained from one panel to another in a series of panels treated. This consistency in the roughening action is the result of the structure selected which is effective to inhibit twisting and side deflecting of the upper reach of the chain body as it is drawn across the face of the panel with the panel advanced thereover. Thus, and with reference to FIG. 1, it should be noted that when the cutters move into a region of wood and should such region offer a greater resistance to cutting than other regions this increases the drag on the chain resulting in the chain twisting clockwise by reason of the movement of the panel to the right over the top of the chain. This in turn could result in a decrease in the cutting action produced by the chain, with normal cutting action being restored on softer wood regions being encountered. With the chain body including multiple strands and with these strands being supported both above and below the upper reach of the chain body by the guide bars discussed, any such tendency of the upper reach to twist is effectively prevented. The support provided by the bars is provided not only along regions disposed above and below the upper reach, but also in regions disposed to either side of where the cutter teeth are located. The guide bars in addition to inhibiting twisting of the upper reach also function to prevent the upper reach from being carried sideways in the direction of panel travel.

With a given adjustment, therefore, in the frame structure which supports the upper reach of chain and with the bed plates 14, 20 which control the depth of cutter teeth contacting the face of the panel which is the actual face being processed a uniform type of scarifying is produced which is consistent with thick as well as thin panels.

The use of multiple strands of chain as the chain body mounting the cutting teeth is also important in facilitating the removal of a tooth when repair or replacement is necessary. Further explaining, to remove a tooth the pins 44 which extend through the base of the tooth to be removed are backed out sufficiently to permit the easy removal of the tooth while not breaking the continuity of the chain by breaking the continuity of strands 38, 40. It is an easy matter then to replace the tooth removed by fitting it on to such pins and advancing them back into their former position, simultaneously with reassembly of strand 42 which is broken down to permit tooth removal.

While an embodiment of this invention has been described, it should be obvious that variations and modifications are possible without departing from the invention.

I claim:

1. Apparatus for producing a textured surface on a workpiece conveyed along a path comprising:

cutter means including an endless chain body comprising multiple endless elongated strands of roller chain connected to each other in side-by-side relationship, and a series of cutter teeth secured to said chain body along its length and projecting outwardly therefrom;

said strands of roller chain being connected by pins extending transversely therethrough and across the width of the combined strands of roller chain;

said cutter teeth being mounted on said pins between adjacent strands of roller chain thus permitting cutter teeth to be added to or removed from the cutter means by removing certain links from the pins in a strand of chain on one side of the cutter teeth while leaving links in a strand on the other side of the cutter teeth connected; and support means for supporting said cutter means with the chain body disposed in a reach extending transversely of said path, said support means comprising at least a pair of elongated guides disposed with one guide paralleling and immediately adjacent one side and the other guide paralleling and immediately adjacent the other side of a strand of chain in said chain body where it extends in said reach, said guides thus operating to confine the reach.

2. The apparatus of claim 1, wherein said support means further comprises another pair of elongated guides, said guides of said other pair paralleling and being immediately adjacent opposite sides of another strand of chain in said reach, said teeth being mounted between said first-mentioned and said other strand of chain.

3. Apparatus for producing a textured surface on a workpiece conveyed along a path comprising:

cutter means including an endless chain body and a series of cutter teeth joined to said chain body along its length and projecting outwardly therefrom;

said chain body including a strand of roller chain comprising rollers, pins which extend transversely through the strand of roller chain journaling the rollers, and opposed laterally spaced link plates mounted on the pins at either end of the rollers with the link plates projecting both above and below the rollers; and support means for supporting said cutter means with the chain body disposed in a reach extending transversely of said path and with the cutter teeth along said reach projecting into said path, said support means comprising a pair of guides paralleling and immediately adjacent said strand of chain where it extends in said reach, said guides fitting against the tops and bottoms of the rollers and between the opposed link plates, thus to inhibit lateral movement and twisting of the chain body and the cutter means.

4. Apparatus for producing a textured surface on a workpiece conveyed along the path comprising:

cutter means including an endless chain body and a series of cutter teeth joined to chain body along its length and projecting outwardly therefrom;

support means for supporting said cutter means with the chain body disposed in a reach extending transversely of said path and with the cutter teeth along said reach projecting into said path, said support means comprising at least a pair of elongated guides, with one on one side and the other on the other side of said chain body where it extends in said reach, operating to confine the reach of said chain body; and a mounting for said guides comprising a first subframe on which said one guide is mounted, a second subframe on which the other guide is mounted, said second subframe being movable relative to said first subframe to vary the distance between said guides, locking means for releasably locking said second subframe against movement relative to said first subframe, and adjustment means for moving the second subframe relative to said first subframe.

5. The apparatus of claim 4, wherein said second subframe is slidably mounted on said first subframe and said locking means comprises a tightenable fastener adapted to clamp said subframes together into tight frictional contact.

6. The apparatus of claim 1, wherein the cutter teeth project into the work path to contact one surface of a workpiece conveyed therealong and which further comprises yieldable biasing means positioned immediately opposite the cutter teeth adapted resiliently to press against the opposite surface of such workpiece and urge it to remain in contact with the cutter teeth.

7. Apparatus for producing a textured surface on a workpiece comprising:

means in the apparatus defining a path of travel for the workpiece;

cutter means including an endless chain body and a series of cutter teeth joined to the chain body along its length and projecting outwardly from the outer peripheral side of the chain body;

support means for supporting said cutter means with the chain body disposed in a reach extending transversely of said path and with the cutter teeth along said reach projecting into said path, said support means comprising at least a pair of elongated guides disposed with one on the inner peripheral side of and the other on the outer peripheral side of said chain body where it extends in said reach, said guides being operable to confine the reach on opposite sides and the guide on the inner peripheral side being nonyielding thereof;

said cutter teeth projecting into said path thus operating to engage one surface of a workpiece conveyed along said path; and yieldable biasing means positioned directly opposite the cutter teeth where such project into said path adapted resiliently to press against the opposite surface of such workpiece and to urge it to remain in contact with the cutter teeth.